Sept. 28, 1954 R. ANDERSON 2,690,198
SAW TOOTH CUTTER FOR DIVIDING BONE FOR ORTHOPEDIC OPERATIONS
Filed Jan. 18, 1950 2 Sheets-Sheet 1
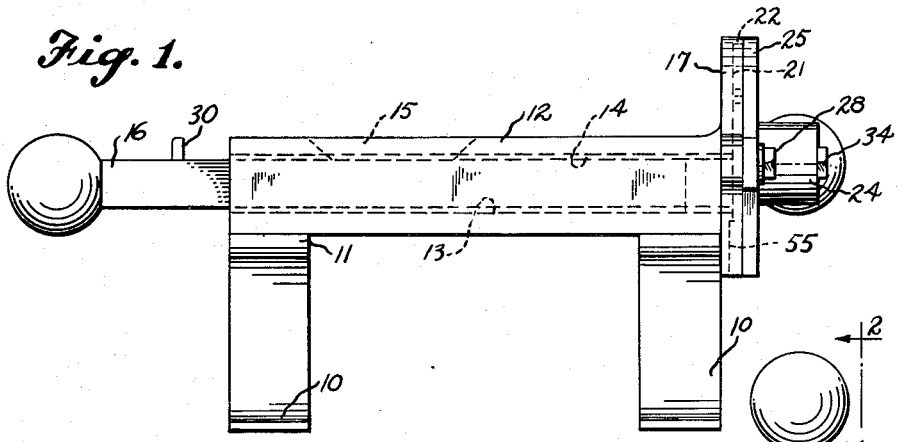
Fig. 1.
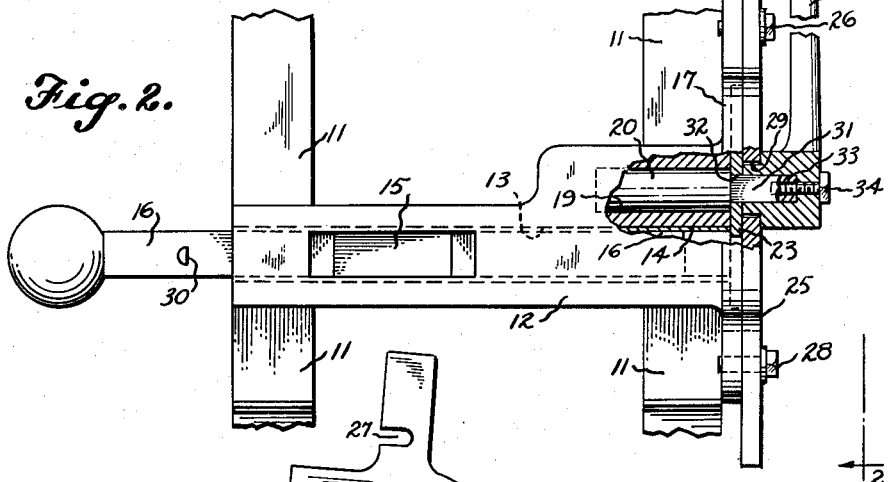
Fig. 2.
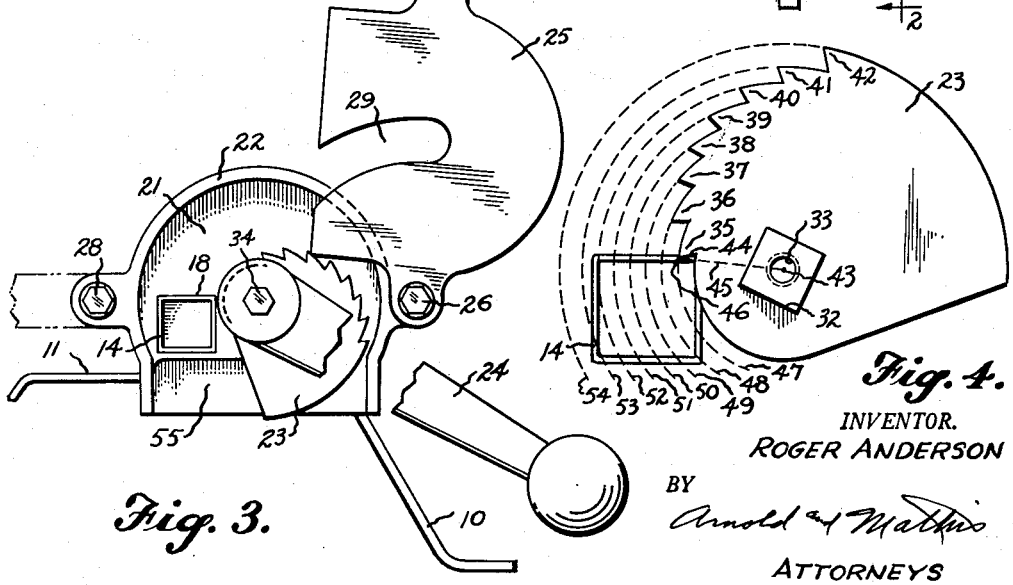
Fig. 3.
Fig. 4.
INVENTOR.
ROGER ANDERSON
BY
*Arnold & Mathis*
ATTORNEYS

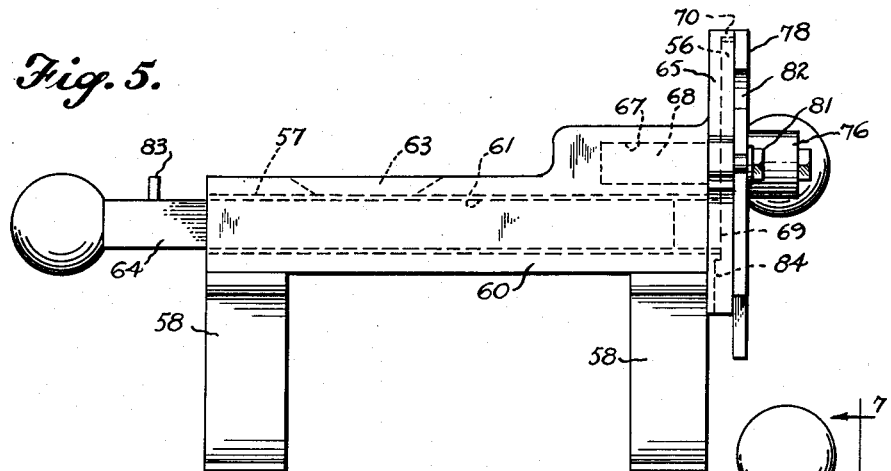
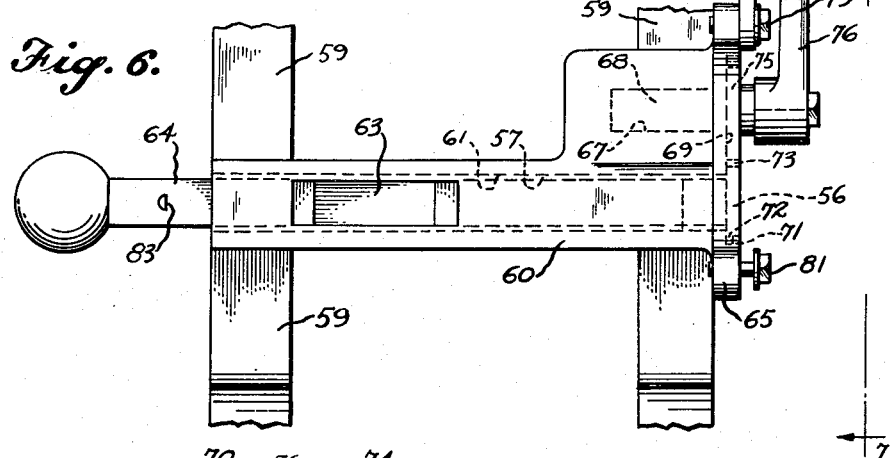
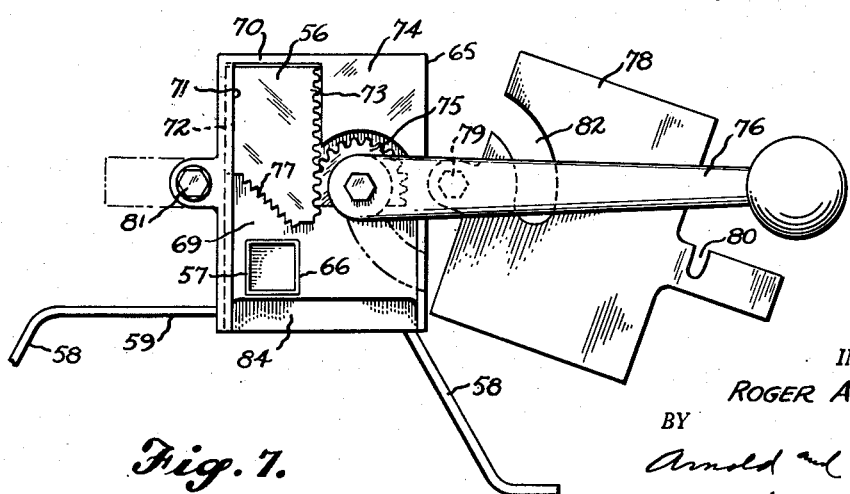

Patented Sept. 28, 1954

2,690,198

UNITED STATES PATENT OFFICE 2,690,198

SAW TOOTH CUTTER FOR DIVIDING BONE FOR ORTHOPEDIC OPERATIONS

Roger Anderson, Seattle, Wash.

Application January 18, 1950, Serial No. 139,172

2 Claims. (Cl. 146—145)

My invention relates to methods and apparatus for providing divided pieces of human bones for use by orthopedic surgeons, as in bone grafts between fragments of a fracture of living human bones, in reconstruction or rebuilding of areas of living human bones, in fusions of adjacent living bones, and the like.

Generally, the treatment of living bone fractures comprises reduction, fixation and healing. In many orthopedic cases healing is accomplished without the use of an auxiliary source of bone building material, e. g., if a fracture is properly reduced and fixed, generally there will be satisfactory bone growth for the desired healing upon contact between the fragments of the fracture. However, in many orthopedic cases, including fracture cases and cases requiring reconstruction, rebuilding, or fusion, a source of auxiliary bone building material is necessary. This auxiliary source of bone building material heretofore has been from relatively large pieces of bone obtained from bones of the patient, as the shin or hip bone.

In massive grafts, as heretofore employed in connection with the healing of fractures, a relatively large piece of bone from the patient was employed to span the fracture. Such piece of bone was generally secured to fragments of the fracture by mechanical means, as wires or screws, so that the piece of bone employed in the graft was mechanically secured to the fragments of the fracture and tended to mechanically support the reduced fracture and thus in part or whole provide for desired fixation. During the healing process such pieces of bone or auxiliary source of bone building material became absorbed and were redeposited or utilized as a part of the functional bone or healed bone.

Massive grafts, as just described, have many shortcomings including a large requirement of bone to provide the desired mechanical strength and extent of auxiliary source of bone building material and a relatively slow rate of bone rebuilding of the bone being treated and a relatively slow rate of dissolving of the auxiliary supply of bone building material. Because of the many shortcomings of massive bone grafts other technics have been substituted therefor, including bone fixation of fractures by mechanical means, such as pins, half pins, wires, etc. After the fracture was so fixed, fragments or pieces of bones were employed and located in the fracture area as the auxiliary source of bone building material. Such a procedure seemed to increase the rate of healing or, in other words, the rate of bone building. However, such procedures had many shortcomings and the pieces of bones employed were still relatively large.

I have discovered that relatively small pieces of bone obtained by tearing the same away from a relatively large piece of bone are best suited as an auxiliary source of bone building material for bone grafts, bone rebuilding and reconstruction, or fusions.

In the attempt to provide fragments or pieces of bone for use by orthopedic surgeons, a hammer and a chisel method was used in chiseling off or subdividing a piece of bone. This method was found wanting in that nonuniform and odd shaped pieces of bone were obtained, such pieces were very difficult to pack or locate in the desired area, and it was very difficult to obtain and maintain such pieces sterile. For example, pieces of bone chiseled from a larger piece of bone tend to fly away from the chisel and they are difficult to confine and maintain sterile and are not generally of the desired shape and size. However, it was found that such a heterogeneous mass of bone particles provided by a hammer and chisel method produced an auxiliary source of bone building material which seemed to increase the rate of bone building or reduce the healing period over massive grafts.

With the development of power operated saws for use by orthopedic surgeons, attempts were made to divide pieces of bone by sawing the bone in a manner to provide relatively small pieces of bone. The pieces of bone so obtained were found wanting as a source of auxiliary bone building material and they did not seem to appreciably increase the rate of bone growth. Probably the surface area of the bones provided by the saw cuts were damaged by the sawing action or the surface area of the bone fragments was not such as to enhance bone growth. The damage of such surface area of the bone fragments is probably explained by the fact that the saws tended to destroy bone cells on the surface areas of the bone fragments or otherwise impair the properties of the bone fragments so that they did not readily enter into the healing process. After determining that the hammer and chisel method and the sawing method were not the answer to this long standing problem in the orthopedic art, I tried other apparatus and methods to obtain bone fragments of a size and in such a condition so that they would more readily enter into the healing process and provide a suitable source of auxiliary material of bone building material. Of such other methods and apparatus I tried grinding apparatus commonly employed in grinding animal bones for fertilizers. Also, I tried grinders of the type generally employed for grinding meat, and the like. In both instances the results were adverse and I did not obtain divided bone material of a character or in a condition so the same could be readily handled and packed and at the same time provide auxiliary bone building material of a size, shape and character to produce desirable results.

My present invention relates to a bone subdividing device and method resulting in tearing or cutting away relatively small fragments from a relatively large bone and thus providing bone fragments of a form generally simulating burrs or bread crumbs, which are generally cube like in shape, have ragged or roughened marginal surfaces where the same have been separated from other pieces of bone, and are generally characterized by a minimum of crushing or of compressing of the bone pieces or crumbs. As an illustration of a practical size, but not as a limitation of my invention, the bone crumbs of my invention are generally cube like in shape, and have a dimension of approximately one-eighth inch.

In providing such crumb or burr like bone pieces from bone suitable as a source of auxiliary bone building material for living bones, the nature of such bones to be subdivided must be considered. Cortical bone generally is defined as hard and brittle bone and generally is on the surface area of bones or characterizes an area or areas of a bone. Some bones, either throughout or in defined areas, as beneath the cortical bone, are a type of bone referred to as cancellous bone which is in general soft and is easily mashed or compressed. In infants most bones are cancellous bone and in general they progressively harden with age so that some bones, or areas thereof, become cortical bone.

In order for a device to provide desired sized particles of bone and of a nature so that the said bone crumbs or burrs or pieces function as a desirable source of auxiliary bone building material, devices must be able to simultaneously and alternately handle bone of the cortical or cancellous type, e. g., to properly subdivide the harder cortical bone and without undue mashing or compressing of cancellous bone.

Also, devices to accomplish the objects of my invention must be able to handle both hard and soft bones either simultaneously, alternately, or separately, and yet allow a sufficiently uniform product so that the product delivered from devices of my invention can be used without further segregation or separation before use. Such mode of operation of devices of my invention is particularly important in that it permits more complete utilization of all bone pieces or crumbs produced. In this way any excess bone can be stored away under suitable sterile and temperature conditions so that in fact "bone banks" for pieces of bone are now practical as the pieces can be used without further segregation or dividing. Thus "bone banks" have now become more practical in view of my invention and in their field, they serve similar to the more publicized "blood banks." It is not at all uncommon to produce sufficient bone auxiliary building material from the same amount of starting material for three or four patients as was heretofore required for a single patient for similar operations.

In using bone crumbs or burrs obtained by devices of my invention, the said particles or pieces are commonly mixed with the blood of a patient obtaining from the incision or presenting of the bone area to form a paste-like mixture which is easily handled and which tends to adhere together. Due to the multiplicity of contact areas or interlocking and entanglement of the irregular surface areas of bone pieces of my invention, any slight movement between the fragments of a fracture does not appear to be harmful to healing as such slight movement apparently merely causes a slight rubbing motion between bone particles which apparently tends to stimulate bone growth as many orthopedic operations employing bone crumbs of my invention have involved a phenomenally rapid rate of healing. In such orthopedic operations where fixation was needed, it was obtained by well known and commonly employed structure, such as casts, bone plates, mechanical bone fixation pins and wires, and the like. In the event that bone particles or bone crumbs obtained by my invention are used in reconstruction and rebuilding bone work or in bone fusions, then bone fixation devices often are not desired or needed.

The above mentioned general objects of my invention, together with others inherent in the same, are attained by the devices illustrated in the accompanying drawings, throughout which like reference numerals indicate like parts:

Figure 1 is a side elevational view, with parts broken away, of a device embodying my invention and with the cover plate closed;

Fig. 2 is a plan view, with parts broken away, of the construction shown in Fig. 1 and with the cover plate in an open position;

Fig. 3 is an end view looking in the direction of broken line 2—2 of Fig. 2;

Fig. 4 is a diagrammatic view to better illustrate cutting action obtained by use of the device illustrated in Figs. 1 to 3 of the drawings;

Fig. 5 is a view in side elevation, similar to Fig. 1, of a modified form of the present invention;

Fig. 6 is a plan view, similar to Fig. 2, of the construction shown in Fig. 5 of the drawings; and Fig. 7 is a view similar to Fig. 3 and of the construction shown in Figs. 5 and 6 of the drawings.

Referring now to the construction shown in Figs. 1 to 4 of the drawings, a supporting structure is formed of any suitable means, such as legs 10 and cross supports 11. The housing 12 is rigid with cross supports 11. I have found that aluminum alloys, commonly obtained on the market, are suitable for providing the desired strength and lightness of material for the legs 10, cross supports 11, and housing 12. Preferably such parts, after formation, are anodized for appearance of surface and elimination of porous surfaces so that the parts can be readily sterilized. The housing 12 is provided with a longitudinally extending chamber 13, which is preferably square in section. A tubular member 14, which is also preferably square in section, is pressed into the chamber 13 to form a liner therefore. The internal surface of member 14 is preferably surfaced with a suitable material, as hard chromium, or the member 14 is made of a suitable material, as stainless steel, so the same can be readily sterilized and resist compression and wear. An infeed hopper opening 15 is provided interconnecting with the bore of tube 14 and of suitable size to permit insertion therein of bones which are to be divided. A plunger 16, which is illustrated as manually operable, is of a size to longitudinally slide in the bore of tube 14 so that bone pieces inserted through the opening 15 can be urged in a given direction, and there maintained despite any action of the cutting plate to move them in the opposite direction. For example, bone material may be urged towards the right, as viewed in Fig. 1 of the drawings. The housing 12 carries an internally recessed housing plate 17. The housing plate 17 is rigid with the housing 12 and is provided with an opening 18 snugly fitting about the tube 14. Also, the housing plate 17 and housing 12 are provided with a tubular bore 19 which functions as a bearing for a shaft 20. The shaft 20 may be moved longitudinally of the bore 19 for removal or insertion. The housing plate 17 is provided with a recessed portion 21 which is surrounded by a flange portion 22. The recessed portion 21 of the housing plate 17 is circular and concentric with the axis of the bore 19. The shaft 20 rigidly carries a cutting plate 23 and the cutting plate 23 has a thickness so that when one face thereof is flush against the wall of the recessed portion 21, the opposite face thereof is flush with the inside surface face of cover plate 25. The depth of the recessed portion 21 from flange 22 is sufficient to permit cutting plate 23 to freely angularly move in said recessed portion 21. Also the concentric arcuate portion of cutting plate 23 closely follows the inside circular wall of flange 22. The cutting plate 23 is rigidly secured to the shaft 20 and is angularly moved therewith. A lever arm 24, of any desired suitable length to obtain the desired leverage, is rigid on shaft 20. The cover plate 25 is preferably fulcrumed on a cap screw 26 and is provided with a recess 27 which can be moved into and out of registration with another cap screw 28. Thus, upon loosening of cap screws 28 and 26, the cover plate 25 can be angularly moved and in a clockwise direction, as viewed in Fig. 3 of the drawings, about cap screw 26 as the fulcrum. If it is desired to merely angularly move cover plate 25, then cap screws 26 and 28 will be merely loosened. However, if it is desired to remove plate 25, then cap screw 28 can be loosened and cap screw 26 removed. Cover plate 25 is preferably provided with a radial recess or slot 29 which is axially alined about the axis of cap screw 26 and said slot 29 snugly passes about shaft 20.

As the parts of this device should be subject to easy assembly and disassembly so that the parts can be readily sterilized, the cover plate 25 can be readily removed as indicated. Next, the shaft 20 carrying cutting plate 23 and lever arm 24 can be readily removed. Next, the tube 14 is internally plated or formed of a material that is readily sterilized and such tube 14 is snugly pressed into bore or chamber 13 and any likelihood of contamination between the outside of tube 14 and bore 13 is thus eliminated. Also, plunger 16 may be readily removed. When the device is thus disassembled, the parts thereof can be readily inserted into a usual hospital sterilizer and the parts readily sterilized before the device is used. Also, the plunger 16 is provided with a stop member 30 so that its movement toward the right, as viewed in Figs. 1 and 2 of the drawings is limited to prevent accidental movement of the plunger too far in this direction and permit engagement of the cutting plate 23 with the plunger 16.

One way of securing cutting plate 23 rigid on shaft 20 is to provide shaft 20 with a patterned portion 31, as a square, and cutting plate 23 with matching recess 32, as the square recess 32 shown in Figs. 2 and 4, and interfitting the same. Shaft 20 is provided with axial threaded bore 33. Lever arm 24 is provided with a square recess to fit over shaft portion 31 and permit the lever arm 24 to abut against blade 23. Cap screw 34 passes through the opening in lever arm 24 and threadedly engages shaft portion 31. By such a construction all of the strain in turning cutting plate 23 is carried directly by shaft portion 31 and lever arm 24 and not on cap screw 34. The squared end of shaft portion 31 and the square recess 32 in blade 23 are obviously only illustrative of suitable patterns and other shapes will prevent relative motion between the cutting plate 23 and the lever arm 24 and the detailed description is to be considered as illustrative rather than as a limitation.

Referring now to Fig. 4 of the drawings, the cutting plate 23 and associated parts are shown in an enlarged scale over that shown in the previous figures. Cutting teeth 35 to 42 inclusive are progressively located radially outwardly from the center of angular movement 43 of the cutting plate 23. The cutting faces of each of the cutting teeth 35 to 42 inclusive are preferably inclined backwardly from a radius of the cutting plate 23 connecting with the forward edge of each cutting tooth 35 to 42 inclusive. For example, as shown in connection with cutting tooth 35, the cutting face 44 is inclined backwardly from a radius 45 connecting between the center of angular movement 43 of the cutting plate 23 and the forward cutting portion 46 of the tooth 35. In this way the cutting edge 46 of the cutting face 44 cuts first and in effect undercuts the bone. This preferable type of cutting tooth provides for easier cutting and less compressing and damage to the bone crumbs. The cutting tooth 35 cuts any bone in tube 14 defined by dotted line 47 and within the internal bore of tube 14. Cutting tooth 36 cuts any bone within the area defined between dotted lines 47 and 48. Similarly, cutting teeth 37 to 42 inclusive cut bone within the tube 14 and respectively within the areas defined by dotted lines 49 to 54 inclusive. The cutting teeth 35 to 42 inclusive are on a circle eccentric to the center 43 of angular movement of the cutting plate 23 and in the structure shown, the cutting teeth are not uniformly spaced apart for optimum results. For devices for subdividing the relatively small amounts of bones which will be needed for most orthopedic cases, approximately one-half a turn or approximately 180° of angular movement of shaft 20 is sufficient. Also angular movement downwardly, while cutting, of handle 24 is desirable. Thus, the teeth 35 to 42 inclusive are preferably spaced apart amounts within such angular movement of shaft 20. If ratchet means are employed so that a greater amount of angular movement of shaft 20 obtains, then it is preferable that only one of the teeth 35 to 42 inclusive, or a relatively small number thereof be permitted to cut at the same time.

When a piece or pieces of bone is or are inserted through the infeed opening 15, it is or they are urged towards the right, as viewed in Figs. 1 and 2 of the drawings, by the plunger 16 until the bone abuts against the cover plate 25. Any tendency of the piece or pieces of bone being subdivided to move to the left is resisted by pressure on plunger 16. Until all of the bone, between the inside of cover plate 25 and the wall face forming recess 21, is cut away by the teeth 35 to 42 inclusive and until the cutting plate 23, is moved back to its normal position shown in Fig. 3 of the drawings, the bone cannot be urged any further towards the right, as viewed in Figs. 1 and 2 of the drawings. The arrangement and relative proportions of the cutter 23 and teeth thereon to the internal sectional size of tube 14 is such that devices generally following the relative sizes of the parts shown operate very successfully where a number of pieces of bone are fed into tube 14. If devices are to operate on a single piece of bone approximating the internal sectional size of tube 14 or if the internal sectional size of tube 14 is relatively increased, then the size, throat, and spacing of the teeth of cutter 23 should be changed to prevent compression of the torn off bone particles. On the up stroke or return stroke of the lever arm 24 and plate 23, the teeth on the cutting plate 23 will pass between the wall forming recess portion 21 of the housing plate 17 and the inside surface of the cover plate 25. It is to be noted that portion 55 is recessed from portion 21 and thus an enlarged area or space is provided between portion 55 and plate 25. When the plate 23 has been moved downwardly and below tube 14, then the bone particles may expand in the chamber between portions 55 and plate 25. The ledge forming the top of recessed portion 55 functions to wipe or clean out pieces of bone in the teeth 35 to 42 inclusive during a return stroke. Thus, devices embodying the present invention, where a lever arm is to be turned approximately a quarter of a turn about its axis of rotation, the reciprocating angular movement of the cutting plate 23 provides for a return movement during which the teeth are cleaned of pieces of bone so said pieces of bone are not present during the next cutting operation and where they could be crushed. Also, the tubular member 14 should be of a shape, such as square, so that as the cutting plate 23 angularly moves downwardly it urges bone toward a corner, such as the lower left hand corner of tube 14, as appears in Fig. 3 of the drawings, and thus holds pieces of bone to be subdivided so bone crumbs or burrs can be uniformly torn therefrom. Obviously, other shapes than a square shape will provide the desired holding action to the bone stock being cut as the plate 23 angularly moves.

In Figs. 1 to 4 of the drawings I have thus illustrated an angularly movable cutting plate 23 arranged to operate across the face of tube 14 and with the teeth on the cutting plate 23 arranged in a circular path which is eccentric with the center of angular movement of the cutting plate 23. Instead of such detailed construction, my invention may take other forms and as an illustration of one thereof, I have shown in Figs. 5 to 7 inclusive, a reciprocating cutting plate 56 provided with a suitable operating means to reciprocate the same across a tubular member 57 which is the counterpart of the tubular member 14 shown in the previous drawings.

In Figs. 5 to 7 of the drawings, the supporting structure may comprise legs 58, cross supports 59 and housing 60. The parts 58 to 60 inclusive correspond to the parts 10 to 12 inclusive of the previous figures. However, housing 60 is slightly changed over housing 12 to accommodate parts of different sizes than those cooperating in connection with housing 12. The housing 60 is provided with a longitudinally extending chamber 61 which corresponds with the chamber 13. A tubular member 57 (corresponding with tubular member 14) is likewise pressed into chamber 61. The infeed hopper 63 corresponds with the infeed hopper 15 and plunger 64 corresponds with the plunger 16.

The housing 60 carries an internally recessed housing plate 65 corresponding in function with the housing plate 17, however, the housing plate 65 and the housing 60 are of different sizes and shapes than the corresponding housing plate 17 and housing 12 because of the size, shape and operations of parts cooperating therewith.

The housing plate 65, like the housing plate 17, is provided with an opening 66 corresponding with opening 18, which snugly fits about the tube 57. Also, the housing plate 65 and the housing 60 are provided with a tubular bore 67 which functions as a bearing for a shaft 68 (tubular bore 67 and shaft 68 corresponding with tubular bore 19 and shaft 20). The housing plate 65 is provided with a recessed portion 69 which is surrounded by a flange portion 70 corresponding to flange portion 22. Cutting plate 56, which corresponds in function with the cutting plate 23, is mounted for slidable reciprocating movement in recessed portion 69 and a guide 71 slidably mounts one edge 72 of cutting plate 56. On the opposite edge cutting plate 56 is provided with a plurality of teeth to form a rack portion 73. A guide portion 74 guides an edge portion of cutting plate 56 for a reciprocating motion. The rack portion 73 meshes with a pinion member 75 and angular movement imparted to the pinion member 75 in a given direction results in sliding movement of the cutting plate 56 in a given direction. Also, alternate angular movement of the pinion member 75 results in reciprocating sliding movement of the plate 56. The pinion member 75 may be in the nature of a fragment of a pinion, as shown, as less than a complete revolution of the pinion 75 need be employed in the event of less than a complete revolution of shaft 68. The shaft 68 non-rotatably carries lever arm 76 which may have a movement similar to the lever arm 24. The pinion 75 and lever arm 76 may be non-rotatably mounted on shaft 68 in the same manner that cutting plate 23 and lever arm 24 were mounted on shaft 20. The cutting plate 56 is provided with a plurality of teeth 77 for cutting bone, which teeth 77 correspond to teeth 35 to 42 of cutting plate 23. As the lever arm 76 is angularly moved, shaft 68, rigid therewith, angularly moves and in turn pinion 75 angularly moves. Pinion 75 meshes with rack portion 73 and sliding movement of cutting plate 56 obtains by reason of such angular movement of the pinion 75. Again, the lever arm 76 will, in many instances, operate through an angle of substantially 180° as this will impart sufficient and desired motion to the cutting plate 56.

A cover plate 78, corresponding to cover plate 25, is of a size and shape to cover the end of the device shown in Fig. 7 and fits over flange portion 70.

The cover plate 78 may be removably mounted in the same manner as cover plate 25 and such mounting will include cap screw 79, recess 80, cap screw 81, and radial slot 82 (parts 79 to 82 inclusive corresponding respectively to parts 26 to 29 inclusive).

The plunger 64, like the plunger 16, is provided with a stop member 83, stop member 83 corresponding to stop member 30. The recess portion 84 (Fig. 7) corresponds to the recess portion 55 for clearing the teeth of the cutter blade on its return stroke, which in the instance of Figs. 5 to 7 inclusive, will be clearing the teeth 77 of bone on the return stroke of the cutting plate 56.

From the foregoing description of Figs. 5 to 7 inclusive, and from correlating the parts thereof to the corresponding parts in the previous figures, it is believed that the construction shown in Figs. 5 to 7 inclusive and the mode of operation of the parts will be apparent. Primarily, the construction of Figs. 5 to 7 inclusive indicates a reciprocating cutting plate 56 operable across tubular member 57 as distinguished from the angularly reciprocable plate 23 operable across a tube 14.

The construction of Figs. 1 to 4 inclusive and of Figs. 5 to 7 inclusive both show a plate having reciprocating movement as distinguished from continuous rotary motion. The advantage of the constructions so shown is that we have a return stroke and simple means cooperating therewith to clean bone fragments which have been cut by the cutting teeth during the cutting stroke. If continuous rotary motion is provided then auxiliary means for cleaning the teeth should be provided so that there will not be bone crumbs in the cutting teeth at the start of a cutting stroke and which said bone crumbs might thus be compressed or crushed. While I may provide auxiliary means for cleaning the teeth of a rotary cutter, I find such construction unnecessary in the greatest use of devices embodying my invention. The amount of bone pieces normally needed around hospitals is such that a hand operated reciprocating device will provide sufficient product for the normal needs of such a hospital. According to present indications there seems to be a very limited field for devices having a greater production than that possible by the reciprocating devices illustrated and hence further embodiments of my invention and particularly those relating to a continuously rotating type of cutter are not here described and shown.

From the foregoing it is obvious that I have provided devices for dividing bone into relatively small pieces or crumbs which comprise a device for holding bone, as the conduit or tube 14, into which bone may be inserted through the infeed 15 and advanced longitudinally of the conduit means or tube 14 by the plunger 16. The said conduit means 14 has a discharge opening which is flush with the recess portion 21 of Figs. 1 to 4 or flush with the recess portion 69 of Figs. 5 to 7 and which portions lie in a common plane so that the cutter 23 of Figs. 1 to 4 or which cutter 56 of Figs. 5 to 7 moves across and flush with the discharge end portion of the conduit or tube 57 or 14. Next, the cover plate 25 of Figs. 1 to 4 or the cover plate 78 of Figs. 5 to 7 functions as a stop means limiting the extent that bone may be projected out of the discharge opening of conduit 14 or 57. Next, the cutter plate 23 or 56 is mounted for movement across the discharge of either tube 14 or 57, flush therewith, and between the said discharge opening and the stop means formed by the cover plate 25 or 78. Next, each of the cutter 23 or 57 has cutting teeth on the advancing edge portion thereof and lever arm 24 or 76 is provided to impart movement to the cutting plate. Cutting plate 25 has a particular design and construction, as previously described and likewise cutter plate 56 shows another different design which is useful. The various illustrations of devices of this invention disclose a method of dividing bone into relatively small pieces wherein the bone is first held and the end portion of the bone is successively torn away by the staggered teeth of either of the cutters 23 or 56. After the end portion of a bone has been so torn away, then the bone is successively advanced and successive end portions of the bone are torn away in the same manner as was the first end portion of the bone torn away. In tearing away the successive end portions of the bone they are progressively torn away due to the action of either cutting plate 23 or 56.

Obviously, changes may be made in the forms, dimensions, and arrangement of the parts of this invention without departing from the principle thereof, the above setting forth preferred forms of embodiment of the invention.

I claim:

1. A device for dividing fresh live green bone into relatively small fragments of generally cube like shape having ragged or roughened marginal surfaces and suitable for use in bone grafting comprising conduit means through which bone may be longitudinally moved, said conduit means having a bone receiving opening and a bone discharging opening; stop means limiting the extent that bone may be projected out said discharge opening; an angularly movable cutter plate mounted for movement across said discharge opening and adjacent said stop means, and about an axis parallel to and remote from said conduit, said cutter plate having an advancing edge portion eccentric to its axis of movement; cutting teeth on the advancing edge portion of said cutter plate and being offset from each succeeding tooth such that each following tooth tears away a small portion of bone in a path symmetrical to the path of tearing of the preceding tooth; and means for moving said cutter plate.

2. A device for dividing fresh live green bone into relatively small fragments of generally cube like shape having ragged or roughened marginal surfaces and suitable for use in bone grafting comprising conduit means through which bone may be longitudinally moved, said conduit means having a bone receiving opening and a bone discharging opening; a movably mounted cover member having a plain inside face spaced from and aligned with the discharge opening of the conduit and functioning as a stop means limiting the extent that bone may be projected out of said discharge opening; plunger means in the conduit for feeding the bone longitudinally of said conduit means; means for moving the plunger; a removable shaft mounted for rotary movement, and positioned alongside and parallel to said conduit means; a cutter plate rigid on said shaft and movable across said discharge opening; said cutter plate being of such thickness as to extend across between said discharge opening and the inside face of said lower member; crank means on said shaft for angularly moving the same; the general shape of the cutting edge of the plate being spiral and having under cut cutting teeth on the spiral edge portion of said cutter plate and the cutting edges of the teeth being offset from each succeeding tooth such that each following tooth tears away a small portion of bone in a path symmetrical to the path of tearing of the preceding tooth.

(References on following page)

References Cited in the file of this patent

UNITED STATES PATENTS

| Number | Name | Date |
|---|---|---|
| 24,614 | Cantelo | July 5, 1859 |
| 54,446 | Utley | May 1, 1866 |
| 108,411 | Tuell | Oct. 18, 1870 |
| 172,814 | Wilson | Jan. 25, 1876 |
| 203,928 | McIntyre | May 21, 1878 |
| 372,173 | Rigby | Oct. 25, 1887 |
| 409,480 | Mann et al. | Aug. 20, 1889 |
| 470,395 | Hannum | Mar. 8, 1892 |
| 474,728 | Farrington | May 10, 1892 |
| 498,398 | Lilley | May 30, 1893 |
| 1,155,762 | Segerc | Oct. 5, 1915 |
| 1,395,482 | Davidson | Nov. 1, 1921 |
| 1,516,724 | Haase | Nov. 25, 1924 |
| 1,837,369 | Milam | Dec. 22, 1931 |
| 2,028,080 | Stern | Jan. 14, 1936 |
| 2,621,145 | Sano | Dec. 9, 1952 |

FOREIGN PATENTS

| Number | Country | Date |
|---|---|---|
| 36,505 | Denmark | Sept. 13, 1926 |